United States Patent
Hoffmann et al.

[11] Patent Number: 5,483,004
[45] Date of Patent: Jan. 9, 1996

[54] ACRYLATE COPOLYMER AND PROCESS FOR THE PRODUCTION THEREOF

[75] Inventors: Peter Hoffmann, Senden; Michael Brünnemann, Münster, both of Germany

[73] Assignee: BASF Lacke + Farben AG, Muenster-Hiltrup, Germany

[21] Appl. No.: 211,407

[22] PCT Filed: Sep. 30, 1992

[86] PCT No.: PCT/EP92/02259

§ 371 Date: Mar. 30, 1994

§ 102(e) Date: Mar. 30, 1994

[87] PCT Pub. No.: WO93/07190

PCT Pub. Date: Apr. 15, 1993

[30] Foreign Application Priority Data

Oct. 9, 1991 [DE] Germany .................. 41 33 420.5

[51] Int. Cl.$^6$ .................. C08F 226/06; C08F 220/60
[52] U.S. Cl. .................. 525/326.7; 525/329.4; 525/386
[58] Field of Search .................. 526/263; 525/326.7, 525/329.4, 386

[56] References Cited

U.S. PATENT DOCUMENTS

| | | | |
|---|---|---|---|
| 4,104,227 | 8/1978 | Boessler et al. | 526/263 |
| 5,077,187 | 12/1991 | Factor et al. | 430/536 |

Primary Examiner—Joseph L. Schofer
Assistant Examiner—Wu C. Cheng
Attorney, Agent, or Firm—Anne Gerry Sabourin

[57] ABSTRACT

The present invention relates to an acrylate copolymer containing amino groups, carboxyl groups and, if appropriate, hydroxyl groups which is characterized in that it has been produced by preparing an acrylate copolymer containing amino groups and, if appropriate, carboxyl groups, by means of A) free-radical solution polymerization, using azo initiators at temperatures from 80° to 150° C., of
  $a_1$) 1 to 20% by weight of vinylimidazole and/or dimethylaminopropylmethacrylamide,
  $a_2$) 0 to 50% by weight of one or more monomers containing hydroxyl groups,
  $a_3$) 0 to 50% by weight of one or more monomers containing carboxyl groups, and
  $a_4$) 30 to 85% by weight of at least one further ethylenically unsaturated copolymerizable monomer, the total of the proportions by weight of the components $a_1$ to $a_4$ always being 100% by weight, and the proportions by weight of the components $a_2$ and $a_3$ not both simultaneously being zero, and B) if appropriate, reacting the acrylate copolymer obtained in stage (A) with carboxylic acid anhydrides, the quantity of carboxylic acid anhydrides employed having been selected such that the resulting copolymer has the desired acid number.

22 Claims, No Drawings

ACRYLATE COPOLYMER AND PROCESS FOR THE PRODUCTION THEREOF

The present invention relates to an acrylate copolymer which contains amino groups, carboxyl groups and, if appropriate, hydroxyl groups and is obtainable by copolymerization in an organic solvent at temperatures between 80° and 150° C., using polymerization initiators and using at least one ethylenically unsaturated monomer having a tertiary amino group.

The present invention also relates to a process for the production of these acrylate copolymers and to their use.

Acrylate copolymers which contain amino groups and carboxyl groups are known and are used, for example, as binders in coating agents which contain epoxide resins as curing agents. The amino groups present in the binder then catalyze the carboxy/epoxy reaction taking place during the curing of these coating agents.

Thus, such coating agents based on polyepoxides and on branched acrylate resins containing carboxyl groups and amino groups are known, for example, from WO 87/02,041, the amino groups being introduced into the acrylate resin by producing the acrylate resin with the use of ethylenically unsaturated monomers having a tertiary amino group or by reacting the acrylate resin with compounds which, in addition to at least one tertiary amino group, contain a group which is reactive with the functional groups of the acrylate resin.

These coating agents cure at room temperature or slightly elevated temperature and lead to coatings having good technical properties, but the high color number of the coating agents containing acrylate resins based on the monomers containing amino groups is a disadvantage in the use of the coating agents, especially as a clearcoat.

Moreover, Published Application JP 219,267/83 has disclosed a coating agent which, in addition to a polyepoxide component and a carboxylic acid activated by double bonds and/or hydroxyl groups, contains an acrylate copolymer which has been produced by copolymerization of acrylic monomers having a tertiary amino group, acrylic or methacrylic acid esters and, if appropriate, further monomers. These coating agents cure at room temperature or slightly elevated temperature by means of a reaction of the epoxide groups with the amino groups as lead to coatings having good technical properties. In spite of the use of monomers containing amino groups in the preparation of the acrylate copolymers, no brown coloration of the acrylate solution occurs even after prolonged storage, and this is achieved by the addition of the activated carboxylic acid. A disadvantage of these coating agents known from Published Application JP 219,267/83 is, however, that the addition of the activated carboxylic acid entails a deterioration of the weathering resistance of the resulting coatings.

Japanese Patent Specification 59-36,666 has disclosed a coating agent which is obtainable by mixing acrylate copolymers of acrylic acid esters, monomers containing carboxyl groups and acrylic monomers containing a tertiary nitrogen atom, such as, for example, diethylaminoethyl acrylate, with polyepoxides. These coating agents can be cured at low temperatures and have a high solids content. The disadvantage of these systems is the high color number of the copolymers and the yellowing of the coatings under UV exposure, for example in the QUV test.

Furthermore, Published Application JP 114,838/78 has also disclosed coating agents based on an acrylate copolymer which is obtainable by copolymerization of 0.2 to 10% by weight of acrylic monomers containing a tertiary nitrogen atom, 35 to 99.7% by weight of alkyl (meth)acrylate monomers and 0.1 to 20% by weight of monomers containing hydroxyl groups. The use of vinylimidazole dimethylaminopropylmethacrylamide as amine monomer is not described in Published Application JP 53-114,838. Moreover, these coating agents do not cure via a carboxy/epoxy reaction, but via an epoxy/amine reaction. The disadvantage of these systems is the low crosslinking density.

From German Offenlegungsschrift 3,322,830, coating agents curing at low temperatures are also known which, as binders, contain an acrylate copolymer containing hydroxyl groups and a polyester-polyol and also, as crosslinking agents, partially or wholly blocked polyisocyanates containing isocyanurate groups and, if appropriate, biuret groups. The acrylate copolymers containing hydroxyl groups are prepared with the additional use of 0 to 10% by weight of an amide of acrylic and methacrylic acid and 1 to 25% by weight of an ethylenically unsaturated heterocyclic basic compound such as, for example, vinylimidazole.

The present invention was therefore based on the object of providing an acrylate copolymer which contains amino groups, carboxyl groups and, if appropriate, hydroxyl groups and which has the lowest possible color number and is suitable for use in coating agents which cure at room temperature or slightly elevated temperature and thus can be used, for example, in automotive refinishing. In particular, acrylate copolymers containing amino groups and carboxyl groups were to be provided which, after mixing with polyepoxides and, if appropriate, further polymers containing carboxyl groups, lead to coating agents which show low inherent coloration and low yellowing in the QUV test.

This object is achieved, surprisingly, by an acrylate copolymer of the type mentioned at the outset, which is characterized in that it has been produced by preparing an acrylate copolymer containing amino groups and, if appropriate, carboxyl groups by means of A) free-radical solution polymerization, using azo initiators at temperatures from 80° to 150° C., of $a_1$) 1 to 20% by weight of vinylimidazole and/or dimethylaminopropylmethacrylamide, $a_2$) 0 to 50% by weight of one or more monomers containing hydroxyl groups, $a_3$) 0 to 50% by weight of one or more monomers containing carboxyl groups and $a_4$) 30 to 85% by weight of at least one further ethylenically unsaturated copolymerizable monomer, the total of the proportions by weight of the components $a_1$ to $a_4$ always being 100% by weight, and the proportions by weight of the components $a_2$ and $a_3$ not both simultaneously being zero, and B) if appropriate, reacting the acrylate copolymer containing hydroxyl groups, obtained in stage (A), with carboxylic acid anhydrides, the quantity of carboxylic acid anhydrides employed having been selected such that the resulting copolymer has the desired acid number.

The present invention also relates to a process for the production of these acrylate copolymers. Moreover, the invention also relates to coating agents which contain these acrylate copolymers and to the use of these coating agents.

It is surprising and, in view of the large number of known monomers which contain a tertiary nitrogen atom, it was not foreseeable that, precisely with the use of vinylimidazole and/or dimethylaminopropylmethacrylamide as the ethylenically unsaturated monomer having a tertiary amino group, and with simultaneous use of azo initiators as polymerization initiators, acrylate copolymers having a markedly reduced color number are obtained. A further advantage is that the coatings formulated with these show only very slight yellowing in the QUV test. In addition, the coating agents according to the invention are distinguished by rapid curing coupled at the same time with a good pot life.

Below, the acrylate copolymer according to the invention will first be discussed in more detail. The preparation of the acrylate copolymers can here take place by various routes. Thus, by copolymerization of vinylimidazole and/or dimethylaminopropylmethacrylamide, monomers containing hydroxyl groups, if appropriate monomers containing carboxyl groups and also further ethylenically unsaturated monomers, an acrylate copolymer which contains amino groups and hydroxyl groups as well as, if appropriate, carboxyl groups can be prepared. This acrylate copolymer can be used directly in coating agents which contain polyisocyanates as curing agents. Preferably, however, the resulting acrylate copolymer containing amino groups and hydroxyl groups is reacted in a further stage with carboxylic acid anhydrides to give an acrylate copolymer which contains amino groups and carboxyl groups and, if appropriate, also hydroxyl groups and which can then be used in coating agents containing polyepoxides as curing agents. Finally, by copolymerization of vinylimidazole and/or dimethylaminopropylmethacrylamide, monomers containing carboxyl groups, if appropriate monomers containing hydroxyl groups and further ethylenically unsaturated monomers, an acrylate copolymer which contains amino groups and carboxyl groups and, if appropriate, hydroxyl groups and which can be used in coating agents containing polyepoxides as curing agents, can also be produced directly.

Acrylate copolymers which, in addition to amino groups, also contain carboxyl groups and, if appropriate, hydroxyl groups, are preferably obtainable by preparing an acrylate copolymer by means of A) free-radical solution polymerization, using azo initiators at temperatures from 80° to 150° C., preferably between 90° and 120° C., of $a_1$) 1 to 20% by weight of vinylimidazole and/or dimethylaminopropylmethacrylamide, $a_2$) 0 to 50% by weight of one or more monomers containing hydroxyl groups, $a_3$) 0 to 50% by weight of one or more monomers containing carboxyl groups and $a_4$) 30 to 85% by weight of at least one further ethylenically unsaturated copolymerizable monomer, the total of the proportions by weight of the components $a_1$ to $a_4$ always being 100% by weight, and the proportions by weight of the components $a_2$ and $a_3$ not both simultaneously being zero, and B) if appropriate, reacting the acrylate copolymer obtained in stage (A) with carboxylic acid anhydrides, the quantity of carboxylic acid anhydrides employed having been selected such that the resulting copolymer has the desired acid number.

Particularly preferably, the acrylate copolymers are obtainable by first preparing an acrylate copolymer containing hydroxyl groups from $a_1$) 5 to 15% by weight of vinylimidazole and/or dimethylaminopropylmethacrylamide, $a_2$) 20 to 40% by weight of one or more monomers containing hydroxyl groups, $a_3$) 0 to 10% by weight of one or more monomers containing carboxyl groups and $a_4$) 40 to 60% by weight of at least one further ethylenically unsaturated copolymerizable monomer, the total of the proportions by weight of the components $a_1$ to $a_4$ always being 100% by weight, and then reacting this acrylate copolymer in a second stage with carboxylic acid anhydrides, the quantity of carboxylic acid anhydrides employed having been selected such that the resulting copolymer has the desired acid number.

Moreover, those acrylate copolymers are also preferred which are obtainable by first producing an acrylate copolymer containing carboxyl groups, amino groups and, if appropriate, hydroxyl groups from $a_1$) 5 to 15% by weight of vinylimidazole and/or dimethylaminopropylmethacrylamide, $a_2$) 0 to 20% by weight of one or more monomers containing hydroxyl groups, $a_3$) 20 to 50% by weight of one or more monomers containing carboxyl groups and $a_4$) 40 to 60% by weight of at least one further ethylenically unsaturated copolymerizable monomer, the total of the proportions by weight of the components $a_1$ to $a_4$ always being 100% by weight, and, if appropriate, reacting this copolymer in a second stage with carboxylic acid anhydrides, the quantity of carboxylic acid anhydrides employed having been selected such that the resulting copolymer has the desired acid number.

Hydroxyalkyl esters of -unsaturated carboxylic acids having primary or secondary hydroxyl groups can be used as the component $a_2$. Predominantly, hydroxyalkyl esters having primary hydroxyl groups are used, since they have a higher reactivity in the polymer-analogous reaction with the carboxylic acid anhydride. Of course, mixtures of hydroxyalkyl esters having primary hydroxyl groups and hydroxyalkyl esters having secondary hydroxyl groups can also be used, for example if, in the copolymer containing carboxyl groups, hydroxyl groups are required for, for example, adjusting the compatibility of the copolymer containing carboxyl groups with the polar epoxide resins used, such as, for example, the commercial product Santolink LSE 120 or LSE 114 made by Monsanto.

Examples of suitable hydroxyalkyl esters of $\alpha,\beta$-unsaturated carboxylic acids having primary hydroxyl groups are hydroxyethyl acrylate, 3-hydroxypropyl acrylate, 4-hydroxybutyl acrylate and the corresponding methacrylates- 2-Hydroxypropyl acrylate, 2-hydroxybutyl acrylate, 3-hydroxybutyl acrylate and the corresponding methacrylates may be mentioned as examples of hydroxyalkyl esters having a secondary hydroxyl group and which can be used.

Of course, the corresponding esters of other $\alpha,\beta$-unsaturated carboxylic acids can also be used each case, such as, for example, those of crotonic acid and isocrotonic acid.

Advantageously, the component $a_2$ can at least partially be a reaction product of one mol of hydroxyethyl acrylate and/or hydroxyethyl methacrylate and on average two mol of e-caprolactone. The component $a_2$ used can at least partially also be a reaction product of monomers containing hydroxyl groups with ethylene oxide and/or propylene oxide. The number of the ether groups of the reaction product is in general less than 15, preferably less than 10.

Examples of suitable monomers $a_3$ containing carboxyl groups are unsaturated carboxylic acids such as, for example, acrylic acid, methacrylic acid, itaconic acid, crotonic acid, isocrotonic acid, aconitic acid, maleic acid and fumaric acid, halfesters of maleic acid and fumaric acid and also $\beta$-carboxyethyl acrylate and adducts of hydroxyalkyl esters of acrylic acid and/or methacrylic acid with carboxylic acid anhydrides, such as, for example, 2-methacryloyloxyethyl monophthalate, 2-methacryloyloxyethyl monohexahydrophthalate, 4-acryloyloxybutyl monohexahydrophthalate and also caprolactone-modified acrylate monomers with COOH groups, such as, for example, the commercial product TONE XM 300 made by Union Carbide/USA, which is a polyester acrylate based on caprolactone, having a molecular weight of about 500 and a polymerizable double bond and a carboxyl group. The long-chain monomers containing terminal carboxyl groups, described in EP-B1-230,330 on page 2, line 29, to page 4, line 8, are also suitable as components $a_3$.

These long-chain monomers containing carboxyl groups can be prepared, for example, by first reacting monomers containing hydroxyl groups with ethylene oxide and/or propylene oxide and then reacting the resulting products with an acid anhydride to give the monomer containing carboxyl groups.

For building up the acrylate copolymer, yet further ethylenically unsaturated copolymerizable monomers $a_4$ are also used. In the selection of these monomers, care must be taken to ensure that the incorporation of these monomers $a_4$ does not lead to undesired properties of the copolymer. Thus, the choice of the component $a_4$ largely depends on the desired properties of the curable composition with respect to elasticity, hardness, compatibility and polarity.

For example, alkyl esters of ethylenically unsaturated carboxylic acids can be used as component $a_4$.

Examples of these are methyl (meth)acrylate, ethyl (meth)acrylate, propyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, octadecenyl (meth)acrylate and the corresponding esters of maleic acid, fumaric acid, tetrahydrophthalic acid, crotonic acid, isocrotonic acid, vinylacetic acid and itaconic acid.

These alkyl esters of ethylenically unsaturated carboxylic acids are usually employed in a quantity from 5 to 50% by weight, preferably from 15 to 35% by weight, each relative to the total weight of the monomers employed.

Further suitable components $a_4$ are also vinyl-aromatic compounds, for example styrene, vinyltoluenes, α-methylstyrene, chlorostyrenes, o-, m- or p-methyl-styrene, 2,5-dimethylstyrene, p-methoxystyrene, styrene, p-tert.-butylstyrene, p-vinylphenol and the like. Vinyltoluenes and especially styrene are used preferably. These vinylaromatic compounds are usually employed in a quantity from 0 to 30% by weight, preferably from 5 to 15% by weight, each relative to the total weight of the monomers employed.

Monomers having at least two polymerizable, ethylenic double bonds can also be used as component $a_4$, especially in order to increase the reactivity and crosslinking density of the coating films.

Advantageously, dimethacrylates of diols having 2 to 12 carbon atoms are used as monomer having at least two polymerizable double bonds, for example glycol dimethacrylate, propanediol dimethacrylate, butanediol dimethacrylate, pentanediol dimethacrylate, hexanediol dimethacrylate, heptanediol dimethacrylate, methylhexanediol dimethacrylate and the like. Reaction products of hydroxyethyl methacrylate and ethylene oxide or propylene oxide, or of the dimers resulting from them, are also used preferably. The preferred use of these branching monomers mentioned has the advantage, as compared with other branching monomers—such as are described, for example, in EP-A-158,161—of a better color number with the advantage of a reduction in the required quantity of regulator.

The use of branching monomers based on diacrylates can, due to secondary reactions (Michael addition of the mercapto group of the regulator to the double bonds of the branching monomer, catalyzed by the tertiary amino groups of the vinylimidazole/dimethylaminopropylmethacrylamide, lead to gelations. The use of divinylbenzene and its derivatives leads to an excessive color number of the resins and to brittleness of the resulting films.

Of course, combinations of the polyunsaturated monomers can also be used. If monomers having at least two polymerizable ethylenic double bonds are used as component $a_4$, these compounds are usually employed in a quantity of more than 3 to 30% by weight, preferably 5 to 25% by weight, each relative to the total weight of the monomers used.

Polysiloxane macromonomers having a number-average molecular weight from 1,000 to 40,000, preferably 2,000 to 10,000, and on average 0.5 to 3.0 ethylenic double bonds per molecule can also be used as component $a_4$. The use of these polysiloxane macromonomers leads to coatings which can readily be overpainted and have good weathering resistance, good resistance to solvents and chemicals as well as good topcoat appearance and adequate scratch resistance.

For example, the polysiloxane macromonomers described in DE-OS 3,807,571 on pages 5 to 7, in DE-OS 3,706,095 in columns 3 to 7, in EP-B 358,153 on pages 3 to 6 and in US Patent Specification 4,754,014 in columns 5 to 9 are suitable as component $a_4$.

Moreover, other acryloxysilane-containing vinyl monomers having the abovementioned molecular weights and contents of ethylenic double bonds are also suitable, for example compounds which can be prepared by reacting hydroxy-functional silanes with epichlorohydrin and then reacting the reaction product with (meth)acrylic acid and/or hydroxyalkyl esters of (meth)acrylic acid.

Polysiloxane macromonomers of the following formula are preferably used as component $a_4$:

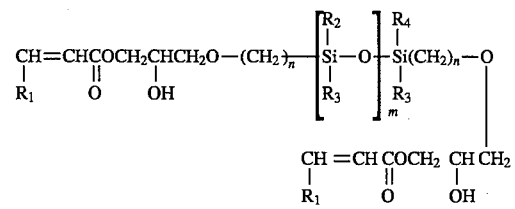

with $R_1$ = H or $CH_3$ $R_2$, $R_3$, $R_4$ and $R_5$ = identical or different aliphatic hydrocarbon radicals having 1 to 8 carbon atoms, especially the methyl radical, or a phenyl radical n=2 to 5, preferably 3 m=8 to 30.

The α,ω-acryloxy-organofunctional polydimethylsiloxane of the formula

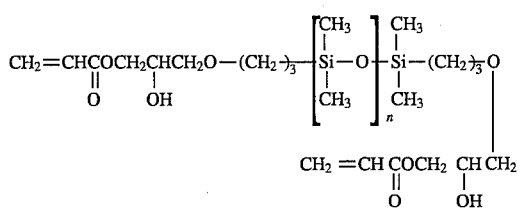

with n~9, an acryloxy equivalent of 550 g/equivalent, an OH number of 102 mg of KOH/g and a viscosity of 240 mPas (25° C.) is used particularly preferably.

If polysiloxane macromonomers are used as component $a_4$, the quantity thereof employed is usually less than 5% by weight, preferably between 0.05 and 2.5% by weight and particularly preferably less than 1% by weight, each relative to the total weight of the monomers used. Mixtures of the monomers mentioned can of course also be used as component $a_4$.

The preparation of the copolymers according to the invention is effected by means of solution polymerization in an organic solvent or solvent mixture at temperatures between 80° and 150° C., preferably between 90° and 120° C. The polymerization is preferably carried out with exclusion of oxygen, for example by working in a nitrogen atmosphere. The reactor is fitted with appropriate stirring, heating and cooling devices and with a reflux condenser in which volatile constituents are retained. It is essential to the invention that the polymerization is carried out in the presence of azo initiators such as, for example, azo-biscarboxamides and azo-biscarbonitriles. Examples of suitable azo initiators are azo-bisisovaleronitrile, azo-bis(2,4-dimethylvaleronitrile), azo-isobutylvaleronitrile, azo-bisisobutyronitrile and azo-biscyclohexanonitrile. Derivatives of the azo initiators having further functional groups, for example hydroxyl groups or carboxyl groups, are also suitable. Moreover, mixtures of the initiators mentioned can also be used. Preferably, azo-bisisovaleronitrile is used.

The quantity of initiator is in most cases 0.1 to 5% by weight, relative to the monomer quantity to be processed, but it can also be higher if appropriate. Usually, the initiator, dissolved in a part of the solvent used for the polymerization, is gradually metered in during the polymerization reaction. Preferably, the initiator feed takes about 0.5 to 2 hours longer than the monomer feed, in order to obtain a good effect also during the final polymerization phase. If initiators having only a low decomposition rate, that is to say a long half-life, under the prevailing reaction conditions are employed, it is also possible to introduce the initiator at the start. It is also possible to introduce a part of the initiator at the start.

Preferably, the reaction is carried out in the presence of polymerization regulators, in particular if more than 5% by weight of difunctional monomers are used as component $a_4$, in order to restrict the dispersity of the resulting copolymers and hence to reduce the viscosity of the resins. Suitable regulators are preferably mercapto compounds, mercaptoethanol being used particularly preferably. Examples of other possible regulators are alkylmercaptans such as, for example, t-dodecylmercaptan, octylmercaptan, phenylmercaptan, octyldecylmercaptan and butylmercaptan, and thiocarboxylic acids such as, for instance, thioacetic acid or thiolactic acid.

These regulators are used in a quantity of up to 2% by weight, relative to the monomer quantity to be processed. Preferably, they are dissolved in one of the monomer feeds and added with the monomers, provided that the occurrence of side reactions can be precluded. Preferably, the rate of added regulator is constant in time.

The polymerization is carried out in an organic solvent which is inert to the monomers used and, if appropriate, to carboxylic acid anhydrides. Preferably, the polymerization solids content is at least 30% by weight, particularly preferably between 45 and 60% by weight, relative to the total weight of the reaction mixture. Examples of suitable solvents are commercially available alkylated aromatic hydrocarbons or mixtures having a boiling range from 130° to 220° C., toluene, xylene and other aromatic hydrocarbons, esters such as, for example, butyl acetate, 1-methoxy-2-propyl acetate, butylglycol acetate, ethyl ethoxypropionate and the like as well as aliphatic hydrocarbons and the like. If there is no addition of anhydrides after the polymerization, higher-boiling alcohols and/or ester alcohols such as, for example, sec.-butanol and 1-methoxypropanol can also be used.

The components $a_1$ and/or $a_2$ and/or $a_3$ and/or $a_4$ can also be at least partially introduced at the start, together with a part of the total solvent quantity to be employed, and heated to the particular reaction temperature. The remaining quantity of the solvent is—as already described—preferably added gradually together with the catalyst. The remaining quantity of monomers which may still be present is added continuously.

The carboxyl groups required for curing the coating agents can at least partially be introduced into the copolymer by reacting the acrylate copolymer, containing hydroxyl groups and amino groups and obtained in stage A, with carboxylic acid anhydrides.

The copolymers used for the reaction with the carboxylic acid anhydrides then usually have an OH number from 40 to 250 mg of KOH/g, preferably from 80 to 140 mg of KOH/g.

Carboxylic acid anhydrides suitable for addition to the copolymers containing hydroxyl groups are the anhydrides of aliphatic, cycloaliphatic and aromatic saturated and/or unsaturated di- and polycarboxylic acids such as, for example, the anhydrides of phthalic acid, tetrahydrophthalic acid, hexahydrophthalic acid, succinic acid, maleic acid, itaconic acid, glutaric acid, trimellitic acid and pyromellitic acid, and also halogenated or alkylated derivatives thereof. Preferably, anhydrides of phthalic acid, tetrahydrophthalic acid and hexahydrophthalic acid and also methylhexahydrophthalic anhydride are used.

The reaction of the copolymers containing hydroxyl groups with the carboxylic acid anhydrides usually takes place at temperatures between 40° and 100° C., preferably between 50° and 70° C.

The acrylate copolymers containing amino groups and carboxyl groups, suitable for use in coating agents which are cured by the addition of polyepoxides, preferably have an acid number from 20 to 150 mg of KOH/g, particularly preferably 30 to 90 mg of KOH/g, and an amine number from 5 to 60 mg of KOH/g, particularly preferably from 10 to 40 mg of KOH/g. Preferably, this acrylate copolymer additionally has an OH number greater than 20 mg of KOH/g, since in this case particularly good compatibility with the polar polyepoxides used as crosslinking agents applies.

In addition, these acrylate copolymers, containing amino groups and carboxyl groups and, if appropriate, hydroxyl groups preferably have a number-average molecular weight from 1,500 to 5,000, particularly preferably from 1,500 to 3,500.

In addition to these acrylate copolymers according to the invention, containing amino groups and carboxyl groups, the coating agents can, as binder, if appropriate also contain a condensation resin containing carboxyl groups. Condensation resins having an acid number from 10 to 160 mg of KOH/g, particularly preferably 20 to 120 mg of KOH/g, and an amine number from 3 to 90 mg of KOH/g, particularly preferably 10 to 60 mg of KOH/g, are used preferably. Condensation resins having a number-average molecular weight from 500 to 3,000, particularly preferably from 1,000 to 2,500, are preferably used. In this case, the mixing ratio is usually between 40 and 90% by weight of acrylate copolymer and between 10 and 60% by weight of condensation resin. Preferably, the mixing ratio is 70 to 50% by weight of acrylate copolymer and 30 to 50% by weight of condensation resin.

Examples of suitable condensation resins are polyesters and/or alkyl resins containing carboxyl groups. For example, the polyester resins described in WO 88/01,629 on page 3, line 15, to page 12, line 20, are suitable, care having to be taken in the selection of the build-up components described therein, to ensure that they have no adverse effect on the color number of the coating agents.

For the preparation of polyesters having the lowest possible color number, the use of aliphatic and cycloaliphatic polycarboxylic acids or anhydrides thereof, which are not produced by the oxo process, is preferred. The use of cyclohexanedicarboxylic acid is particularly preferred, since it leads to colorless polymers which, in addition, at the same time lead to good drying and evolution of hardness in the paint film. If appropriate, monocarboxylic acids such as, for example, benzoic acid, tert.-butylbenzoic acid, lauric acid, isononanoic acid and fatty acids from naturally occurring oils can also be used-together with the polycarboxylic acids. Dimer fatty acids such as, for example, the commercial products PRIPOL 1009, 1013 and 1022 made by Unichema, can also be used as the polycarboxylic acid for rendering these condensation resins flexible.

Preferably, the condensation resins used also contain tertiary amino groups, provided that these amino groups have no adverse effect on the color number of the coating agents. Preferably, the amino groups are introduced into the condensation resin by using N-methyl-bis-(2-hydroxyethyl)-amine as a build-up component.

As crosslinking agents, these coating agents according to the invention contain epoxide compounds having at least 2 epoxide groups per molecule. Because of the lower yellowing tendency, aliphatic and/or alicyclic epoxide resins are used in particular. The crosslinking agent is here usually employed in such a quantity that the ratio of the free carboxyl groups of the binder (acrylate copolymer plus, if appropriate, further polycondensation resin containing carboxyl groups) to the epoxide groups of the epoxide resin is in the range from 1:3 to 3:1. The content of binder plus crosslinking agent in the coating agent is usually between 30 and 70% by weight, relative to the total weight of the coating agent.

Examples of epoxide resins suitable as crosslinking agents are cycloaliphatic bis-epoxides, epoxidized polybutadienes which are formed by reaction of commercially available polybutadiene oils with peracids or organic acid/$H_2O_2$ mixtures, epoxidation products of naturally occurring fats, oils, fatty acid derivatives and modified oils, novolaks containing epoxide groups, glycidyl ethers of a polyhydric alcohol, for example ethylene glycol diglycidyl ether, glycerol polyglycidyl ethers, sorbitol polyglycidyl ethers, trimethylolpropane polyglycidyl ethers and pentaerythritol polyglycidyl ethers, and also suitable acrylate resins having oxirane side groups. Moreover, reaction products of polyepoxides, containing hydroxyl groups, with di- or polyisocyanates, such as are formed, for example, by reacting OH-functional epoxides such as, for example, sorbitol polyglycidyl ethers with isophorone diisocyanate, can also advantageously be used as crosslinking agents.

Further preferably used crosslinking agents are polar epoxides, for example those based on a reaction product of melamine resins with acrylamide with subsequent epoxidation of the acrylic double bond. As examples of this class of substances, the commercial products Santolink LSE 114 and Santolink LSE 120 made by Monsanto may be mentioned, wherein the epoxide resin backbone is a binuclear melamine, the number-average molecular weight is about 1,200 to 2,000 and the epoxide equivalent weight is about 300 to 350.

Examples of solvents suitable for the coating agents according to the invention are toluene, methoxypropanol, xylene, butanol, ethyl acetate, butyl acetate, pentyl acetate, dimethyl glutarate, dimethyl succinate, 1-methoxy-2-propyl acetate, ethoxyethyl propionate, 2-ethylhexanol, ethylene glycol diacetate, ethylene glycol monoethyl and monobutyl ether or acetates thereof, ethylene glycol dimethyl ether, diethylene glycol dimethyl ether, aromatics-containing naphthas, cyclohexanone, methyl ethyl ketone, acetone, butyl acetoxyglycolate and ethyl acetoxyglycolate.

These solvents can be used singly or also as a mixture of different solvents. The solvent content of the coating agents is usually between 70 and 30% by weight, relative to the total weight of the coating agent.

In addition, the coating agents according to the invention can also contain conventional auxiliaries and additives in conventional quantities, preferably 0.2 to 10% by weight, relative to the total weight of the coating agent, for example small quantities of a conventional reducing agent and also leveling agents, silicone oils, plasticizers such as phosphate esters and phthalate esters, additives controlling the viscosity, dulling agents, UV absorbers and light stabilizers and the like, and also, if appropriate, extraneous curing catalysts such as, for example, 1,4-diazabicyclo[2.2.2]octane (DABCO), diazabicycloalkenes such as, for example,- 1,5-diazabicyclo[4.3.0]non-5-ene and 1,8-diazabicyclo[5.4.0]undec-7-ene and other amines, provided that they have no adverse effect on the yellowing of the clearcoats. Preferably, 1,4-diazabicyclo[2.2.2]octane is used as the crosslinking catalyst.

The coating agents according to the invention are especially suitable for use as a clearcoat, particularly preferably for application to a water-based paint (metallic water-based paint or pigmented water-based paint). However, they can also be used, for example, as a pigmented topcoat. They are therefore preferably free of filler and pigment but, if desired, can also contain conventional pigments and fillers in conventional quantities, preferably 0 to 60% by weight, relative to the total weight of the coating agent, such as, for example, talc, mica, kaolin, chalk, quartz powder, asbestos powder, barium sulfate, silicates, glass fibers, titanium dioxide and the like.

These coating agents can be applied in the form of a film to a substrate by spraying, flooding, dipping, rolling, blade application or brushing.

The coating agents according to the invention can be applied to the most diverse substrates. Examples of suitable substrates are metals, such as iron, zinc, titanium, copper, aluminum, steel, brass, bronze, magnesium or the like, and also ceramics, wood, glass, concrete and plastics.

The coating agents according to the invention cure at a relatively low temperature, i.e. at room temperature or slightly elevated temperatures. The low curing temperature and the short curing time are to be ascribed to the presence of an internal catalyst in the binder system. If short curing times and low curing temperatures are desired, a binder with a relatively high amine number is used.

Due to the low curing temperatures of generally 20° to 80° C., the coating agents according to the invention are especially suitable for automotive refinishing, but they can of course also be used for production line painting. The coating agents are used especially as a clearcoat, for example on a metallic base paint layer. Preferably, they are used as a clearcoat on a water-based paint layer (metallic water-based paint or pigmented water-based paint). However, they can also be used as a pigmented topcoat. Use as a filler or a priming material is also conceivable.

The invention is explained in more detail in the examples which follow. All data on parts and percentages here are data by weight, unless explicitly stated otherwise.

1. Preparation of copolymer solutions according to the invention

A solvent mixture of xylene and butyl acetate is first introduced into a 4 l stainless steel kettle, fitted with a stirrer, reflux condenser and feed vessels, and heated to 110° C. The total quantity of solvent is fixed such that, after the polymerization has been completed, the non-volatile content is 50% in theory. The mutual ratio of the solvents is 1:1. Minor quantities of xylene (1–2%), relative to the total formulation, can, if appropriate, be retained for cleaning the feed vessels. The monomers are metered in over 3 hours, and the initiator solution (20% solution in butyl acetate) within 3.5 hours.

If dimethylaminopropyl methacrylate is used, the amino-functional monomer must be metered in separately from the regulator. The amino-functional monomer is metered in together with the acrylate esters, and the regulator (mercaptoethanol) together with the methacrylate esters.

During the metering-in, the temperature is kept constant at 110° C. After the initiator feed has been completed, the batch is held for at least two further hours at polymerization temperature, and the solids content and viscosity of the solution are measured hourly.

The copolymer solution is then cooled to 50° C. and the quantity of hexahydrophthalic anhydride calculated to give an acid number of 70 mg of KOH/g (relative to solids content) is added. The acid number of the copolymer after the polymerization is here taken into account. The addition of the anhydride is highly exothermic. After the exothermic reaction has subsided, the batch is held for a further hour at 50° C. and the progress of the reaction is then checked via the acid number by comparing the values after an addition of alcohol and after an addition of water to the sample and subsequent titration with aqueous or alcoholic 0.5 molar KOH. When the two values are almost equal, the batch is diluted with secondary butanol to a concentration of 50%.

Table 1 reproduces the composition of the copolymer solutions. The copolymer solutions E1 and E2 represent examples according to the invention, and the copolymer solutions V1 to V3 represent comparison examples.

In Table 1, AN is the acid number in mg of KOH/g, relative to solid resin. The measured value (1) was determined after the polymerization stage. The measured value (2) was determined after the polymeranalogous reaction. The viscosity was measured in dPa.s on a plate/cone viscometer at 23° C.

2. Preparation of polycondensation resins containing carboxyl groups 2.1 Polycondensate 1 containing carboxyl groups:

| | |
|---|---|
| 1014.1 | parts of hexahydrophthalic anhydride |
| 1245.7 | parts of cyclohexanedicarboxylic acid (90%) |
| 359.1 | parts of methyldiethanolamine |
| 1507.1 | parts of trimethylolpropane |
| 433.5 | parts of isononanoic acid (3,3,5-trimethylhexanoic acid) |
| 167.2 | parts of benzoic acid |
| 197.0 | parts of xylene |
| 4.7 | parts of triisodecyl phosphite | are weighed into a 4 l stainless steel kettle fitted with a stirrer, steam-heated separation column, water separator and reflux condenser.

The mixture is melted and heated in the course of 5 hours to 180° C. The water formed in the reaction is continuously purged, and the xylene entrainer is returned into the kettle. The temperature is maintained at 180° C. until an acid number of 20 mg of KOH at a viscosity of 5.2 dPa.s (50% in xylene) has been reached. The batch is then cooled and partially dissolved with xylene to a solids content of 80%. After deduction of the samples, the quantity of hexahydrophthalic anhydride to be added for a final acid number is calculated to be 636.5 parts. In addition, 0.05% (relative to the solid resin) of triisodecyl phosphite is added. By means of dilution with xylene, the addition is then carried out at a solids content of 70%. During the addition, the temperature is held at 60–80° C. The progress of the reaction is followed by determining the aqueous and alcoholic acid numbers. If the two acid numbers are approximately equal, the batch is partially dissolved with xylene to a solids content of 65% and then with secondary butanol to a solids content of 60%. The polycondensate then has a viscosity of 5.7 dPa.s (50% in xylene, plate/cone 23° C.) and an acid number of 69–71 mg of KOH/g.

2.2 Polycondensate 2 containing carboxyl groups:

Following the same procedure as in the preparation of polycondensate 1, polycondensate 2 is prepared from the following raw materials:

| | |
|---|---|
| 488.0 | parts of hexahydrophthalic anhydride |
| 515.0 | parts of cyclohexanedicarboxylic acid (90%) |
| 82.8 | parts of methyldiethanolamine |
| 752.0 | parts of trimethylolpropane |
| 200.0 | parts of isononanoic acid (3,3,5-trimethylhexanoic acid) |
| 77.0 | parts of benzoic acid |
| 72.5 | parts of neopentyl glycol |
| 88.0 | parts of xylene |
| 1.14 | parts of triisodecyl phosphite |

After an acid number of 18 mg of KOH/g has been reached, the batch is cooled, and 321.1 parts of hexahydrophthalic acid, 886 parts of xylene and 1.12 parts of triisodecyl phosphite are added. The addition reaction is carried out at 50–60° C. until an acid number of 68.3/69.2 (aqueous/alcoholic) has been reached. Subsequently, the batch is partially dissolved with xylene to a solids content of 65% and with secondary butanol to 60%. The polycondensate solution thus obtained has a viscosity of 20.5 dPa.s (plate/cone 23° C.).

3. Preparation and application of clearcoats

Using the components indicated in Table 2, the clearcoat solutions EL1 and EL2 (examples according to the invention) and VL1 to VL3 (comparison examples) are prepared by mixing.

The clearcoat solutions are adjusted by paint dilution to a viscosity of 21 seconds, measured in a DIN 4 flow cup at 20°

C. The paint solutions are then mixed with the indicated quantity of curing agent solution and DABCO solution. To determine the pendulum hardness, castings of the paints on glass are prepared. The paint films are baked for 30 minutes at 60° C. or for 20 minutes at 80° C., then left for a further 2 hours at room temperature (23° C.), and the pendulum hardness is then measured. At a layer thickness of 20 μm (dry) the pendulum hardness of the film is then determined. For the other test procedures, the paint is applied to phosphated and coated steel sheets. For this purpose, the phosphated steel sheets are coated with a commercially available two-component polyurethane filler (OH components = polyester-modified acrylate containing hydroxyl groups and having an OH number of 140–160 mg of KOH/g; isocyanate component=hexamethylene diisocyanate trimerized via the isocyanurate structure), dried overnight and then coated with a commercially available conventional metallic base paint (physically dried, based on polyester resin, melamine resin, cellulose acetobutyrate and aluminum flakes). After a flash-off time of 30 minutes the clearcoat is applied. The panels are immediately subjected to the tests described. The results are compiled in Table 3.

TABLE 1

Composition of the copolymer solutions in parts, and physical properties

|  | E1 | E2 | V1 | V2 | V3 |
|---|---|---|---|---|---|
| Hydroxyethyl methacrylate | 24 | 24 | 24 | 24 | 24 |
| 4-Hydroxybutyl acrylate | 15 | 15 | 15 | 15 | 15 |
| Cyclohexyl methacrylate | 10 | 10 | 10 | 10 | 10 |
| Dimethylaminoethyl methacrylate |  |  |  | 10 |  |
| Vinylimidazole | 10 |  |  |  |  |
| Dimethylaminopropyl-methacrylamide |  | 10 |  |  |  |
| Morpholinoethyl methacrylate |  |  |  | 10 |  |
| Dimethylaminoneopentyl acrylate |  |  |  |  | 10 |
| 1,6-Hexanediol dimethacrylate | 16 | 16 | 16 | 16 | 16 |
| 2-Ethylhexyl acrylate | 10 | 10 | 10 | 10 | 10 |
| Azoisovaleronitrile | 2.6 | 2.6 | 2.6 | 2.6 | 2.6 |
| 2-Mercaptoethanol | 0.5 | 0.5 | 0.5 | 0.5 | 0.5 |
| AN (1) (mg of KOH/g) | 1.5 | 1.5 | 4.14 | 5.32 | 4.1 |
| AN (2) (mg of KOH/g) | 75.5 | 70.0 | 71.1 | 73.3 | 70.0 |
| SC (15 minutes, 180° C.) | 49.5 | 49.0 | 50.4 | 48.0 | 46.4 |
| SC (60 minutes, 130° C.) | 57.1 | 50.6 | 48.3 | 49.4 | 50.4 |
| Viscosity (1) (original) (dPa s) | >40 | 7.1 | 5.0 | 2.9 | 3.2 |
| Viscosity (2) (original) (dPa s) | 35.0 | 35.0 | 16.5 | 4.8 | 6.0 |
| Color number (Gardner) | 2 | 1–2 | 2–3 | 5 | 7 |

TABLE 2

Composition of the clearcoats in parts

|  | EL1 | EL2 | VL1 | VL2 | VL3 | EL3 | EL4 |
|---|---|---|---|---|---|---|---|
| Isopropanol | 3.5 | 3.5 | 3.5 | 3.5 | 3.5 | — | — |
| 1-Methoxypropyl acetate | — | — | — | — | — | — | 14.5 |
| Butyl acetate 85/100 | 11.5 | 11.5 | 11.5 | 11.5 | 11.5 | 10.5 | — |
| Solvenon PM | — | — | — | — | — | 2.0 | — |
| Butylglycol | 2.0 | 2.0 | 2.0 | 2.0 | 2.0 | 2.0 | — |
| Butylglycol acetate | — | — | — | — | — | 1.5 | 1.5 |
| Fluorad FC 430 solution[1] | 2.0 | 2.0 | 2.0 | 2.0 | 2.0 | 2.0 | 2.0 |
| Tinuvin 440[2] | 0.4 | 0.4 | 0.4 | 0.4 | 0.4 | — | — |
| Tinuvin 123[4] | — | — | — | — | — | 1.0 | 1.0 |
| Tinuvin 900[3] | 0.6 | 0.6 | 0.6 | 0.6 | 0.6 | 1.0 | 1.0 |
| Polycondensate 1 | — | — | 27.0 | — | — | — | — |
| Polycondensate 2 | 27.0 | 27.0 | — | 27.0 | 27.0 | 27.0 | 27.0 |
| Copolymer solution E1 | 53.0 | — | — | — | — | — | — |
| Copolymer solution E2 | — | 53.0 | — | — | — | 53.0 | 53.0 |
| Copolymer solution V1 | — | — | 53.0 | — | — | — | — |
| Copolymer solution V2 | — | — | — | 53.0 | — | — | — |
| Copolymer solution V3 | — | — | — | — | 53.0 | — | — |
| DABCO solution[5] | 2.7 | 2.7 | 2.7 | 2.7 | 2.7 | 2.7 | 2.7 |
| Curing agent solution A[6] | 50.0 | 50.0 | 50.0 | 50.0 | 50.0 | — | — |
| Curing agent solution B[7] | — | — | — | — | — | 50.0 | 50.0 |

Explanations for Table 2:

1) Solution of 5 parts of the commercially available leveling agent Fluorad FC 430, made by 3M, in 95 parts of xylene 2) Commercially available light stabilizer based on a sterically hindered amine 3) Commercially available light stabilizer based on benzotriazole 4) Commercially available light stabilizer based on a sterically hindered amine 5) DABCO solution:

| Diazabicyclooctane | 5.5 parts |
|---|---|
| Butylglycol acetate | 9.5 parts |
| 1-Methoxypropyl acetate | 42.5 parts |
| Butyl acetate 98 | 42.5 parts |

6) Curing agent solution A: solution of 63.8 parts of a commercially available epoxide resin based on a binuclear melamine resin, having a number-average molecular weight from 1,200 to 2,000 and an epoxide equivalent weight from 300 to 350 (commercial product Santolink LSE 114 made by Monsanto) in 36.2 parts of methoxypropanol 7) Curing agent solution B: solution of 100 parts of a 60% solution of a commercially available epoxide resin based on a binuclear melamine resin, having a number-average molecular weight from 1,200 to 2,000 and an epoxide equivalent weight from 300 to 350 (commercial product Santolink LSE 114 made by Monsanto) in methoxy-2-propanol and 33.3 parts of butyl acetate 98/100 (solids content 45%)

TABLE 3

| | Results of the paint tests | | | | | | |
|---|---|---|---|---|---|---|---|
| | E1 | E2 | VL1 | VL2 | VL3 | EL3 | EL4 |
| Dilution A % by weight[1] | 26.2 | 23.0 | 24.6 | 10.0 | 7.0 | — | — |
| Dilution B % by weight[2] | — | — | — | — | — | 20 | 20 |
| Drying dust-free[3] (minutes) | 30 | 30 | 30 | 75 | 75 | 90 | 75 |
| tack-free[4] | 210 | 210 | 240 | >360 | 360 | 255 | 225 |
| Drying recorder[5] 1st phase | 20 | 25 | 30 | 25 | 40 | 40 | 30 |
| 2nd phase | 90 | 175 | 195 | 215 | 240 | 150 | 95 |
| 3rd phase | >360 | >360 | >360 | >360 | >360 | 230 | 165 |
| Pendulum hardness[6] 20 minutes, 80° | 79 | 60 | 65 | 41 | 38 | 85 | 90 |
| 30 minutes, 60° | 40 | 39 | 38 | 30 | 25 | 63 | 61 |
| RT, 24 hours | | | | | | 48 | 52 |
| Taping test[7] | m | m | m | st m | st m | m | i.O. |
| Delta E before QUV[8] | 3.35 | 2.80 | 5.06 | 4.18 | 4.6 | — | — |
| Delta E after 500 hours QUV | 3.15 | 4.86 | 9.15 | 10.24 | 7.36 | — | — |

Explanations for Table 3:

[1] Paint dilution A:

| Methoxypropanol | 50 |
|---|---|
| 1-Methoxy-2-propyl acetate | 25 |
| n-Butanol | 25 |

[2] Paint dilution B:

| Butylglycol acetate | 10 |
|---|---|
| 1-Methoxy-2-propyl acetate | 45 |
| Butyl acetate 98/100 | 45 |

3) Freedom from dust: about 15 minutes after the paint has been sprayed on, a small sample of beach sand (3–4 g) is sprinkled onto the panel at one corner. The panel is then dropped on edge from a height of 30 cm (free fall). Freedom from dust has been reached when no sand adheres. The test is repeated every 15 minutes and, just before freedom from dust is reached, the repeat interval is shortened to 5 minutes.

4) Freedom from tack: About 20 minutes after freedom from dust has been reached, a sheet of paper of about 3 cm² is placed upon the painted panel. A small plate of hard plastic is then placed onto this paper, and a weight of 100 g is then placed onto the latter. After precisely 1 minute, it is tested in the same way as in the test from freedom from dust whether the paper still adheres. Time-interval as in the test for freedom from dust.

5) Drying recorder: the test is carried out by means of an apparatus of the B. K. Drying Recorder type, manufacturer: The Mickle Laboratory Engineering Co. Ltd., Gomshall, GB, in accordance with the following instructions. Before the steel sheets are painted with the base paint, 25 mm wide and 30 cm long strips of glass are stuck in the longitudinal direction to each test panel. The test panels together with the glass strips are then coated with the base paint and, after a flash-off time of 30 minutes, with the clearcoat. The glass strips are removed and clamped into a special testing device (drying recorder). By means of the drying recorder, a needle having a diameter of 1 mm is then drawn across the paint over a period of 6 hours. Owing to the drying of the paint, three different scratch tracks, called phases, then appear. In the first phase, the needle penetrates down to the glass, and the paint still coalesces. In the second phase, a scratch track is clearly visible, and the paint no longer coalesces. In the third phase, the needle penetrates only very slightly into the paint surface and leaves only a hardly visible track. The center of the transition between two clearly definable phases is reported as the phase change.

6) König pendulum hardness in amplitudes (factor 1.4= seconds)

The tests are each carried out at an ambient temperature of 20–23° C.

7) Taping test

After the panels have been stored for 24 hours at room temperature, a strip of Tesakrepp 4330 is stuck loosely to the test panel and then pressed on by twice rolling a metal cylinder (about 7 cm long, about 6 cm wide, weight about 1.5 kg) over it. After 1 hour, the tape is removed and the result is assessed in accordance with the intensity of the marking.

Assessment:

| pass: | i.O. |
|---|---|
| slightly marked: | l.m. |
| marked | m |
| strongly marked: | st. m |

8) QUV test

For the QUV test, the clearcoats are applied to phosphated steel sheets. For this purpose, the phosphated steel sheets are coated with a commercially available 2-component polyurethane filler, dried overnight and coated with a conventional pure-white 2-component polyurethane topcoat. After aging for 2–3 days, the panels are lightly sanded and coated with the clearcoat to be tested in a layer thickness of about 50 µm. After an aging phase of 7 days, the relative color shade of the panels thus coated is determined by means of a color computer against an unsanded unexposed white panel. The test sheets are then exposed in a QUV test apparatus (QUV accelerated weathering tester, made by Q-Panel Company, Cleveland, Ohio, USA) in a 12-hour cycle to UV light (light source: FS-40 fluorescent sun lamps UVB 313) for 8 hours at a surface temperature of 70° C., and then for 4 hours to a humidity exposure of 100% relative atmospheric humidity at 50° C. After every 100 hours of light exposure, the shift in color shade as compared with the white unexposed panel is measured. The result is reported as delta E according to DIN 6174 (CIELAB System).

Shifts in color shade of delta E=3 are visible to an unpracticed eye and, in the case of conventional clearcoats based on OH-acrylates which are crosslinked with a trimerized hexamethylene diisocyanate, are as a rule reached after 500 hours' exposure. As can be seen from Tables 1 and 3, the examples according to the invention show, by contrast with the comparison examples, both a lower initial color number (Gardner color numbers, delta E values) and less yellowing after 500 hours, QUV exposure.

We claim:

1. Acrylate copolymer containing functionalities selected from the group consisting of amino groups, carboxyl groups, hydroxyl groups and mixtures thereof, obtained by copolymerizing in an organic solvent at temperatures between 80° and 150° C., using polymerization initiators and using at least one ethylenically unsaturated monomer having a tertiary amino group, characterized in that the acrylate copolymer is produced by A) free-radical solution polymerization, using polymerization initiators at temperatures from 80° to 150° C., of
   $a_1$) 1 to 20% by weight of vinylimidazole and/or dimethylaminopropylmethacrylamide,
   $a_2$) one or more monomers containing hydroxyl groups, wherein the monomers are present in an amount up to 50% by weight,
   $a_3$) 0 to 50% by weight of one or more monomers containing carboxyl groups, and
   $a_4$) 30 to 85% by weight of at least one further ethylenically unsaturated copolymerizable monomer, the total of the proportions by weight of the components $a_1$ to $a_4$ always being 100% by weight, and B) reacting the acrylate copolymer obtained in stage (A) with carboxylic acid anhydrides, wherein the quantity of carboxylic acid anhydrides employed is selected to provide the resulting copolymer with the desired acid number.

2. Acrylate copolymer characterized in that it is produced by
A) preparing an acrylate copolymer containing functionalities selected from the group consisting of amino groups, hydroxyl groups, carboxyl groups and mixtures thereof,
   $a_1$) 5 to 15% by weight of a compound selected from the group consisting of vinylimidazole, dimethylaminopropylmethacrylamide and mixtures thereof,
   $a_2$) 20 to 40% by weight of one or more monomers containing hydroxyl groups,
   $a_3$) 0 to 10% by weight of one or more monomers containing carboxyl groups, and
   $a_4$) 40 to 60% by weight of at least one further ethylenically unsaturated copolymerizable monomer, the total of the proportions by weight of the components $a_1$ to $a_4$ always being 100% by weight, and B) reacting the acrylate copolymer obtained in stage (A) with carboxylic acid anhydrides, and the quantity of carboxylic acid anhydrides employed is selected to provide the resulting copolymer with the desired acid number.

3. Acrylate copolymer according to claim 1, characterized in that the acrylate copolymer has an acid number from 20 to 150 mg of KOH/g and an amine number from 5 to 60 mg of KOH/g.

4. Acrylate copolymer according to claim 1, characterized in that the acrylate copolymer has an acid number from 30 to 90 mg of KOH/g and an amine number from 10 to 40 mg of KOH/g.

5. Acrylate copolymer according to claim 1, characterized in that the acrylate copolymer obtained in stage A is reacted at temperatures of $\leq 60°$ C. with a compound selected from the group consisting of hexahydrophthalic anhydride, derivatives of hexahydrophthalic anhydride and mixtures thereof.

6. Acrylate copolymer according claim 1, characterized in that azobisisovaleronitrile is used as the polymerization initiator.

7. A solvent borne coating composition comprising as a binder, acrylate copolymer containing functionalities selected from the group consisting of amino groups, carboxyl groups, hydroxyl groups and mixtures thereof, obtained by copolymerizing in an organic solvent at temperatures between 80° and 150° C., using polymerization initiators and using at least one ethylenically unsaturated monomer having a tertiary amino group, characterized in that the acrylate copolymer is produced by A) free-radical solution polymerization, using polymerization initiators at temperatures from 80° to 150° C., of
   $a_1$) 1 to 20% by weight of vinylimidazole and/or dimethylaminopropylmethacrylamide,
   $a_2$) 0 to 50% by weight of one or more monomers containing hydroxyl groups,
   $a_3$) 0 to 50% by weight of one or more monomers containing carboxyl groups, and
   $a_4$) 30 to 85% by weight of at least one further ethylenically unsaturated copolymerizable monomer, the total of the proportions by weight of the components $a_1$ to $a_4$ always being 100% by weight, and the proportions by weight of the components $a_2$ and $a_3$ not both simultaneously being zero and optionally B) reacting the acrylate copolymer obtained in stage (A) with carboxylic acid anhydrides, wherein the quantity of carboxylic acid anhydrides employed is selected to provide the resulting copolymer with the desired acid number.

8. Coating composition according to claim 7, wherein, it contains, as binder, an acrylate copolymer containing carboxyl groups and amino groups.

9. Coating composition according to claim 8, characterized in that it contains, as curing agent, epoxide compounds having at least 2 epoxide groups per molecule.

10. Coating composition according to claim 9, characterized in that it contains a curing agent selected from the group consisting of aliphatic epoxide resins, alicyclic epoxide resins and mixtures thereof.

11. Coating composition according to claim 8, characterized in that it contains an additional extraneous crosslinking catalyst.

12. Coating composition according to claim 11, characterized in that it contains, as additional binder, a condensation resin which contains carboxyl groups.

13. Coating composition according to claim 12, characterized in that the condensation resin has an acid number of 10 to 160 mg of KOH/g and an amine number of 10 to 60 mg of KOH/g.

14. An automotive refinish coating comprising the coating composition of claim 7, wherein the acrylate copolymer, contains carboxyl groups and amino groups.

15. The acrylate copolymer, according to claim 1, wherein the monomers are copolymerized, using azo initiators.

16. A clearcoat coating comprising the coating composition of claim 7, wherein the acrylate copolymer, contains carboxyl groups and amino groups.

17. A composite coating comprising the coating composition according to claim 16, as clearcoat, above a water-based paint.

18. The coating compositon of claim 7, wherein acrylate polymer includes monomer containing hydroxy groups in an amount between 1.0 and 50.0 % by weight based on the total weight of components (a1)–(a4) and the acrylate copolymer obtained in stage (A) is reacted with carboxylic acid anhydrides, wherein the quantity of carboxylic acid anhydrides employed is selected to provide the resulting copolymer with the desired acid number.

19. The coating composition of claim 7, wherein the acrylate copolymer obtained in stage (A) is reacted with carboxylic acid anhydrides.

20. The coating composition of claim 7, wherein the acrylate polymer includes monomer containing carboxyl groups (a3) in an amount between 20 and 50% by weight based on the total weight of components (a1)–( a4 ).

21. The coating composition of claim 7, wherein the acrylate polymer includes monomer containing hydroxyl groups in an amount between 20 to 40% by weight based on the total weight of components (a1)–( a4 ).

22. A pigmented topcoat composition comprising the coating composition according to claim 7.

* * * * *